March 3, 1953   R. K. MUELLER   2,630,561
DYNAMO TRANSFORMER
Filed Oct. 14, 1949

INVENTOR
Robert K. Mueller
BY Kenway Jenney Witter
& Hildreth
Attys.

Patented Mar. 3, 1953

2,630,561

UNITED STATES PATENT OFFICE 2,630,561

DYNAMO TRANSFORMER

Robert K. Mueller, Newton, Mass., assignor to Research Corporation, New York, N. Y., a corporation of New York Application October 14, 1949, Serial No. 121,290

2 Claims. (Cl. 336—135)

The present invention relates to electromagnetic apparatus, and more particularly to torque motors and related devices hereinafter referred to as dynamo transformers. For a general description of such devices, reference may be made to my copending application No. 652,523, dated March 7, 1946, now U. S. Patent No. 2,488,734, issued November 22, 1949.

As here used, the term "torque motor" refers to a motor which is not continuously rotatable, and in particular cases is capable of movement through only a relatively small angle, say ten or twenty degrees. Such motors are frequently used in servomechanisms. In some cases they are designed to deliver a constant torque over their full range of movement. In other cases they are designed to deliver a torque which is proportional to the displacement of the rotor from some neutral position. In this latter case the device is referred to as a "stiffness motor."

Closely related to the torque motor is the "pick-off" or variable transformer, which has the same mechanical features as the torque motor but is used to produce a voltage, instead of a torque, varying in accordance with the position of the rotor. A pick-off can be constructed, for instance, to produce an output voltage directly proportional to the displacement of its rotor from the neutral position, or proportional to the square of the rotor displacement.

The above-mentioned properties of torque motors, stiffness motors and pick-offs can be demonstrated theoretically if the assumption is made that the magnetic conductance of each air gap of the stator bears a linear relationship to the displacement of the rotor from its neutral position. The chief obstacle to the achievement of such a condition in practice is the leakage flux between stator and rotor. The flux within the air gaps closely follows the desired linear relationship. However, the leakage flux around the air gaps does not follow a linear relationship.

The chief object of the present invention is to provide a rotor construction which compensates for the non-linearity in the leakage flux variation by introducing an opposing non-linearity in the air gap flux. A second object is to preserve the simplicity of manufacture of the rotor by using only simple shapes in its construction.

Figure 1:
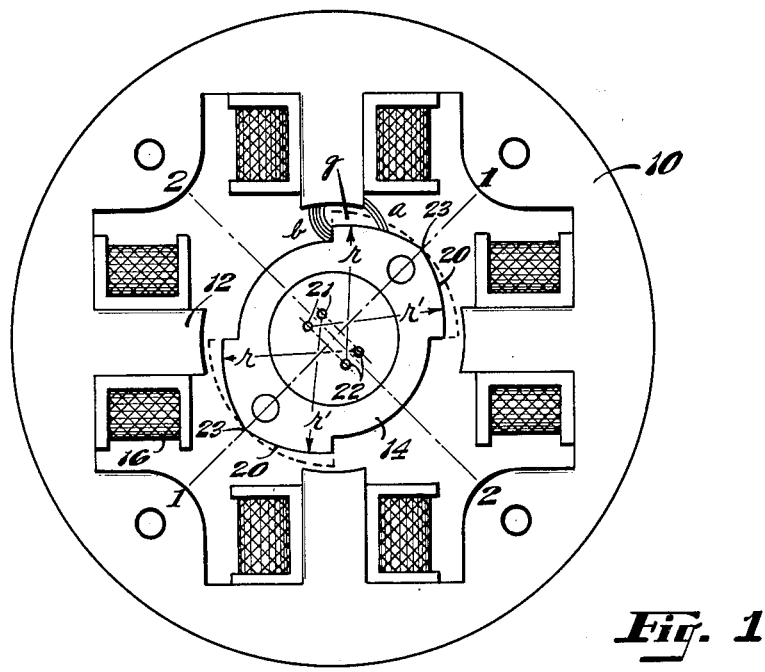
Figure 2:
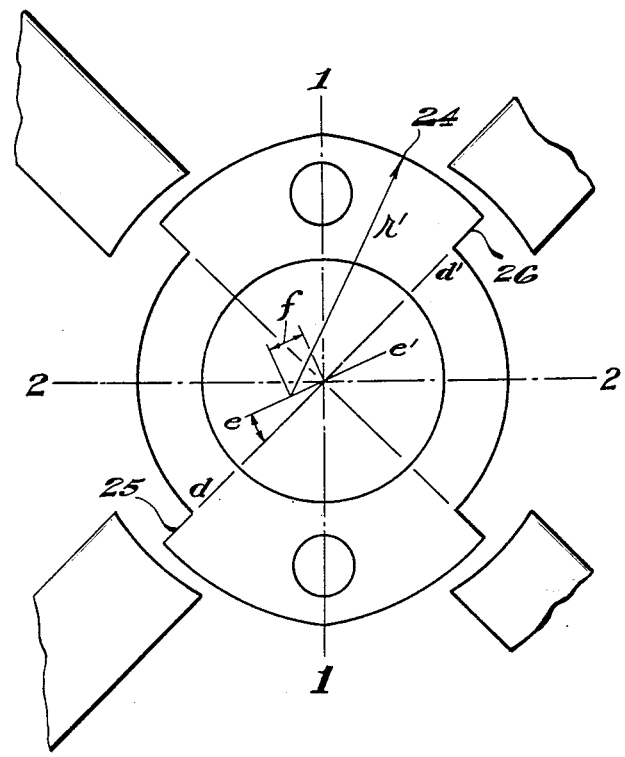

In the accompanying diagrams, Fig. 1 is an elevation of a dynamo transformer embodying the general principles of the present invention. Fig. 2 is an elevation of a particular form of the present invention.

The device shown in Fig. 1 comprises a stator 10 preferably constructed of laminations of magnetic material. The shape is essentially circular, with four re-entrant poles 12 having circular pole faces. Each pole is provided with a winding 16. A rotor 14 is pivoted or journaled in suitable bearings about an axis at the center of the stator frame. The rotor has a major axis 1—1 and a minor axis 2—2. It is made of magnetic material such as soft iron, and is not permanently magnetized, nor does it carry any windings. The end portions 20 of the rotor each span approximately the distance between centers of two adjacent poles.

Fringing effects are produced at all the boundaries of the air gap $g$. There are magnetic flux leakages between the side of the pole and the end of the rotor, as shown at $a$, between the pole face and the side of the rotor (shown at $b$), and between those sides of the rotor and stator parallel to the plane of the diagram. It has been found that the fringing between the pole face and the side of the rotor (type $b$) is by far the most important of these three effects, and it is this type of fringing which the present invention is designed to counterbalance.

I have discovered that a satisfactory compensation can be made for the non-linearity of the leakage flux at $b$ by suitably shaping the rotor faces 20. In my co-pending application both the pole faces and the rotor faces consist of circular arcs drawn about the center of rotation of the rotor. This form makes the magnetic flux within the air gap $g$ bear a substantially linear relationship to the rotor displacement. According to the present invention, by a suitable deviation from this shape, a non-linearity can be introduced in the air gap flux, to counterbalance the non-linearity of the leakage flux.

The preferred rotor design is shown in Fig. 1. Each rotor face 20 is made up of two circular arcs drawn about separate centers 21, 22. The radii $r$, $r'$ of the two arcs have the same length. The centers 21, 22 are symmetrically located with respect to the major axis 1—1, and are located at equal distances from the minor axis 2—2. As limiting cases the centers may be located on either the major or the minor axis. Each arc describes half of the rotor face, and the two intersect in such a way as to form a peak 23 in the middle of the rotor face. The rotor faces on opposite ends of the rotor are identical, so that the centers of the four arcs form the corners of a rectangle whose sides are bisected by the major and minor axes.

With the rotor in the neutral position as shown, the air gap between rotor and pole face is greater at the middle of the pole than at its edge. Furthermore, as the rotor turns so as to come more into line with a pole, the air gap at the edge of the pole face becomes progressively shorter. As the rotor turns away from alignment with a pole, the air gap at the edge of the pole becomes progressively longer.

The operation of the device may be explained by considering the rate of change of the fluxes $g$ and $b$ with a change of angle. For example, if the rotor is assumed to move from the position of Fig. 1 through an angle A in the counter-clockwise direction, the flux is increased in the air gap $g$. Since the gap between the rotor and the edge of the stator pole face diminishes upon counter-clockwise rotation, the increase of total air gap flux is greater than if a linear flux-angle relationship existed.

The shorter the air gap at this point, the greater the amount of flux added to the air gap by a given amount of rotation. The rate of increase of air gap flux becomes progressively larger as the rotor swings into alignment with a pole.

The variation in the rate of change in the air gap flux $g$ tends to offset the change in the leakage flux at $b$. The leakage flux $b$ diminishes as the rotor swings into alignment with the pole face, since the stator pole face, from which lines of leakage flux $b$ emerge, is gradually covered by the movement of the rotor. Furthermore, the rate of change of leakage flux becomes progressively larger as more of the pole face is covered; in other words as the rotor swings toward alignment with a pole, the leakage flux $b$ is being diminished at an increasing rate. At the same time, however, the air gap flux $g$ is being augmented at an increasing rate, due to the shortening of the air gap at the edge of the pole face. Thus, the fluxes at $g$ and $b$ may be expressed in the following way:

$\phi_g = h + kA +$ a non-linear function of A
$\phi_b = h' + k'A -$ a non-linear function of A where $h$, $h'$, $k$ and $k'$ are constants depending on the geometry, number of turns in the windings, etc. The two non-linear variations can be made to offset each other; so that the overall rate of change of flux remains constant, or in other words, the total flux of each pole is a substantially linear function of angle.

When a substantially linear variation of flux with angle is obtained the apparatus may be made to operate a torque motor, or a pick-off, depending on the winding and circuit arrangements, as described in my above-mentioned application. With certain winding arrangements a stiffness motor, which is the equivalent of an electrical spring, may be constructed; in such a case the flux is not a linear function of angle, because the flux crosses two air gaps in series, and the reluctance of one gap increases with angle while that of the other decreases. In the idealized case, where fringing and second-order effects are neglected, the reluctance of one gap may be expressed in the form $$\frac{1}{a+cA}$$

and the reluctance of the other in the form $$\frac{1}{a-cA}$$

and as shown in my above-mentioned application, this acts to provide a torque which is proportional to the angular displacement from neutral position. Stated in another way, the reciprocal of the reluctance, which may be defined as the "magnetic conductance" of any air gap, is ideally a linear function of angle, and the shaping of the rotor introduces a non-linearity which compensates for the non-linearity of the leakage flux.

The same criterion of linearity of magnetic conductance of each air gap is applicable to any type of device according to the invention, whether a torque motor, pick-off or stiffness motor, and it may be stated generally that the magnetic conductance of each air gap may be made, at least to a high degree of accuracy, a linear function of angle by the construction herein described.

The actual dimensions of the device are not readily determined analytically. Although it is probable that complete compensation would require non-circular rotor formations, the use of circular arcs has been found sufficiently accurate in practice, and is preferred because of the greater ease in machining. An illustrative example of satisfactory dimensions is given in Fig. 2.

In Fig. 2, the center of the arc 24 is located as follows: A reference line $d$—$d'$ is first drawn between the two rotor edges 25, 26. From this reference line, an angle of 6° is measured in a clockwise direction, and the radial line $e$—$e'$ is drawn. Along this radial line, a distance equaling 1/30 of the diameter from pole face to pole face is measured. The point thus located is the center for the arc 24. The centers for the other three arcs of the rotor are located in a similar manner.

In general, it may be stated that the rotor faces 20 are constructed for proper slope and curvature relative to the pole faces. As is apparent from Figs. 1 and 2 (Fig. 1 showing the eccentricity in an exaggerated manner) the face 20 slopes with respect to pole face in such a manner that the gap diminishes from the center toward the edge of the pole. Furthermore, the curvature of each rotor face is preferably different from that of the stator pole face, in order to introduce what may be termed a "second-order" non-linearity in the magnetic conductance, and thereby more closely effect a satisfactory compensation. In the construction illustrated, the radius of curvature of the rotor faces 20 is greater than the radius of the stator pole faces, although some constructions permit a smaller radius for the rotor (in which case, it may be noted, a slight valley would appear instead of the peak 23). The longer radius for the rotor faces has been found empirically to give the most effective compensation and the construction shown in the drawings is therefore preferred.

Having thus described my invention, I claim:

1. In a dynamo transformer, the combination of a stator and a rotor, the stator having four pole faces described by arcs of circles drawn about the center of rotation of the rotor, the rotor having two pole faces each spanning substantially the entire angle between centers of adjacent pole faces of the stator and having a neutral axis substantially halfway between the stator poles, the rotor being capable of only limited movement from said neutral axis, the rotor pole faces being made up of arcs of circles eccentric to the rotor axis and symmetrically disposed with relation to said neutral axis to introduce a non-linear variation into the magnetic conductance of the air gap upon movement of the rotor from the neutral axis to compensate for non-linear variations of the fringing flux.

2. In a dynamo transformer, the combination of a stator and a rotor, the stator having four pole faces described by arcs of circles drawn about the center of rotation of the rotor, the rotor having two pole faces each spanning substantially the entire angle between centers of adjacent pole faces of the stator and having a neutral axis substantially halfway between the stator poles, the rotor being capable of only limited movement from said neutral axis, each rotor pole face being made up of two arcs of circles, each arc covering substantially half of a pole face, the centers of the arcs being displaced from the center of rotation of the rotor and symmetrically disposed with respect to said neutral axis, whereby a non-linear variation is introduced into the magnetic conductance of the air gap upon movement of the rotor from the neutral axis to compensate for non-linear variations of the fringing flux.

ROBERT K. MUELLER.

REFERENCES CITED

The following references are of record in the file of this patent:

UNITED STATES PATENTS

| Number | Name | Date |
| --- | --- | --- |
| 735,103 | Hull | Aug. 4, 1903 |
| 1,964,265 | Markley | June 26, 1934 |
| 2,379,417 | Conrad | July 3, 1945 |
| 2,431,860 | Friedlander | Dec. 2, 1947 |
| 2,460,921 | Candy | Feb. 8, 1949 |

FOREIGN PATENTS

| Number | Country | Date |
| --- | --- | --- |
| 23,878 | France | Jan. 13, 1922 |